United States Patent
Ko

(10) Patent No.: US 9,867,003 B2
(45) Date of Patent: Jan. 9, 2018

(54) METHOD OF TRACKING USER'S LOCATION

(71) Applicant: SAMSUNG SDS CO., LTD., Seoul (KR)

(72) Inventor: Ho-Jeong Ko, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 43 days.

(21) Appl. No.: 15/060,766

(22) Filed: Mar. 4, 2016

(65) Prior Publication Data

US 2017/0099580 A1 Apr. 6, 2017

(30) Foreign Application Priority Data

Oct. 6, 2015 (KR) .................. 10-2015-0140518

(51) Int. Cl.
*H04W 24/00* (2009.01)
*H04W 4/02* (2009.01)
(Continued)

(52) U.S. Cl.
CPC ........... *H04W 4/023* (2013.01); *H04W 4/021* (2013.01); *H04W 4/06* (2013.01); *H04W 76/023* (2013.01)

(58) Field of Classification Search
CPC ... H04W 80/04; H04W 40/246; H04W 40/24; H04W 88/04; H04W 88/182; H04W 8/26; H04W 8/005; H04W 8/065; H04W 80/045; H04W 84/18; H04W 40/12; H04W 40/04; H04W 40/248; H04W 80/00; H04W 40/00; H04W 40/10; H04W 48/16; H04W 76/023; H04W 4/005; H04W 64/00; H04W 48/18; H04W 84/005; H04W 16/18; H04W 36/0055; H04W 48/08; H04W 52/0274; H04W 16/32; H04W 36/20; H04W 72/0453; H04W 72/082; H04W 16/10;
(Continued)

(56) References Cited

U.S. PATENT DOCUMENTS 8,135,417 B2 3/2012 Shan et al.
8,213,978 B1 * 7/2012 Ho .................. H04W 24/02
370/227
(Continued)

FOREIGN PATENT DOCUMENTS

KR 10-2006-0022960 A 3/2006
KR 10-2009-0083481 A 8/2009
(Continued)

OTHER PUBLICATIONS

Communication dated Jul. 18, 2016 issued by International Searching Authority in counterpart International Application PCT/KR2015/014162 (PCT/ISA/210).

*Primary Examiner* — Nimesh Patel
(74) *Attorney, Agent, or Firm* — Sughrue Mion, PLLC

(57) ABSTRACT

Disclosed is a method of tracking a user's location. The method comprising: receiving coordinate of each of adjacent mobile devices therefrom, estimating a channel environment to select an optimal channel model, calculating distance between the user's mobile device and each of the adjacent mobile devices based on the selected channel model and calculating coordinates corresponding to a current position of the user's mobile device based on the calculated distance.

16 Claims, 7 Drawing Sheets

(51) Int. Cl.
*H04W 4/06* (2009.01)
*H04W 76/02* (2009.01)

(58) Field of Classification Search
CPC ..... H04W 16/24; H04W 36/30; H04W 4/021; H04W 28/18; H04W 4/023; H04W 72/085; H04L 41/12; G01S 19/42; G01S 2205/008; G01S 5/0215
See application file for complete search history.

(56) References Cited

U.S. PATENT DOCUMENTS

| | | | |
|---|---|---|---|
| 2001/0036810 A1* | 11/2001 | Larsen | H04B 7/2606 455/11.1 |
| 2006/0018412 A1* | 1/2006 | Jung | H04L 27/227 375/341 |
| 2008/0130794 A1 | 6/2008 | Chong et al. | |
| 2009/0315767 A1* | 12/2009 | Scalisi | G01S 19/34 342/357.74 |

FOREIGN PATENT DOCUMENTS

| | | |
|---|---|---|
| KR | 10-0944993 B1 | 3/2010 |
| KR | 10-0975250 B1 | 8/2010 |
| KR | 10-1152384 B1 | 6/2012 |
| KR | 10-1242482 B1 | 3/2013 |
| KR | 10-2015-0053221 A | 5/2015 |
| WO | 2004/100578 A1 | 11/2004 |

\* cited by examiner

[fig. 1]
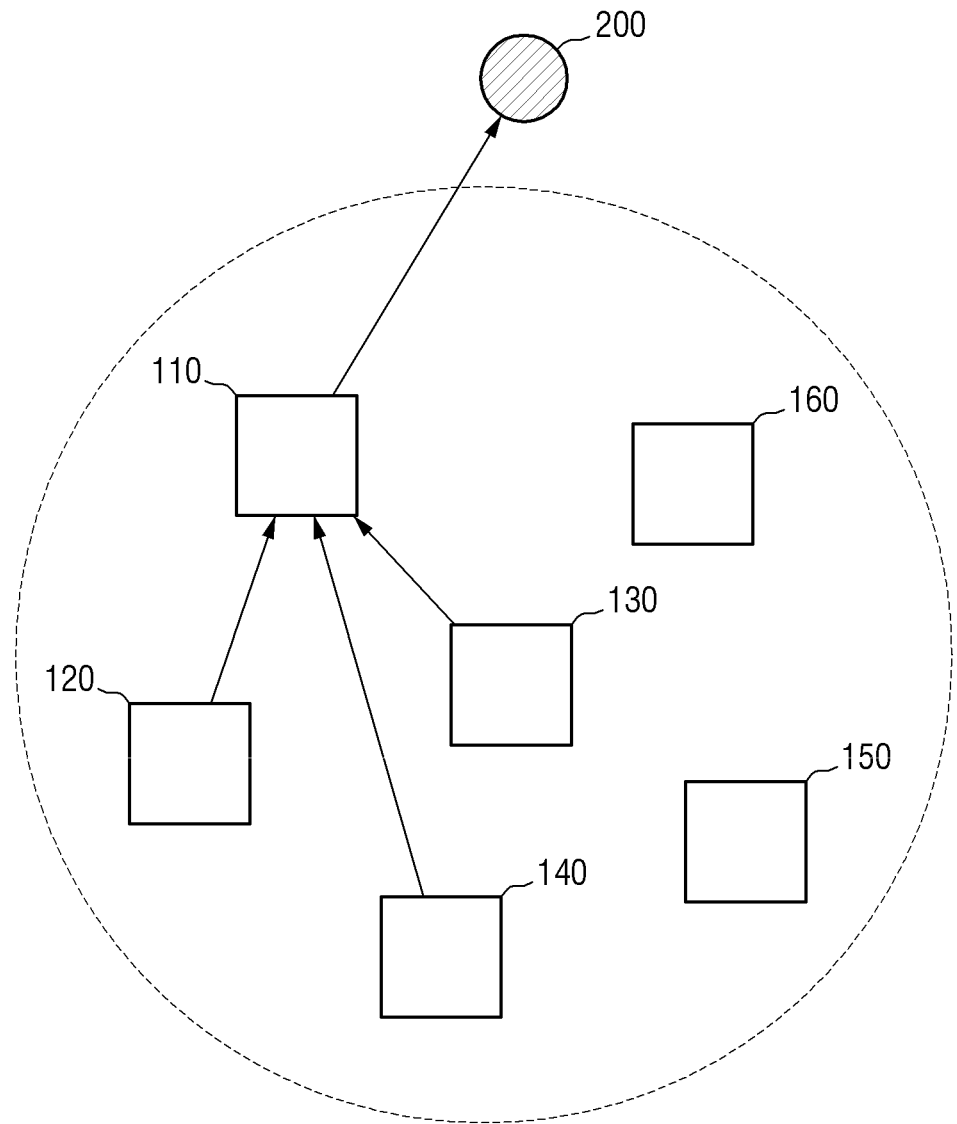

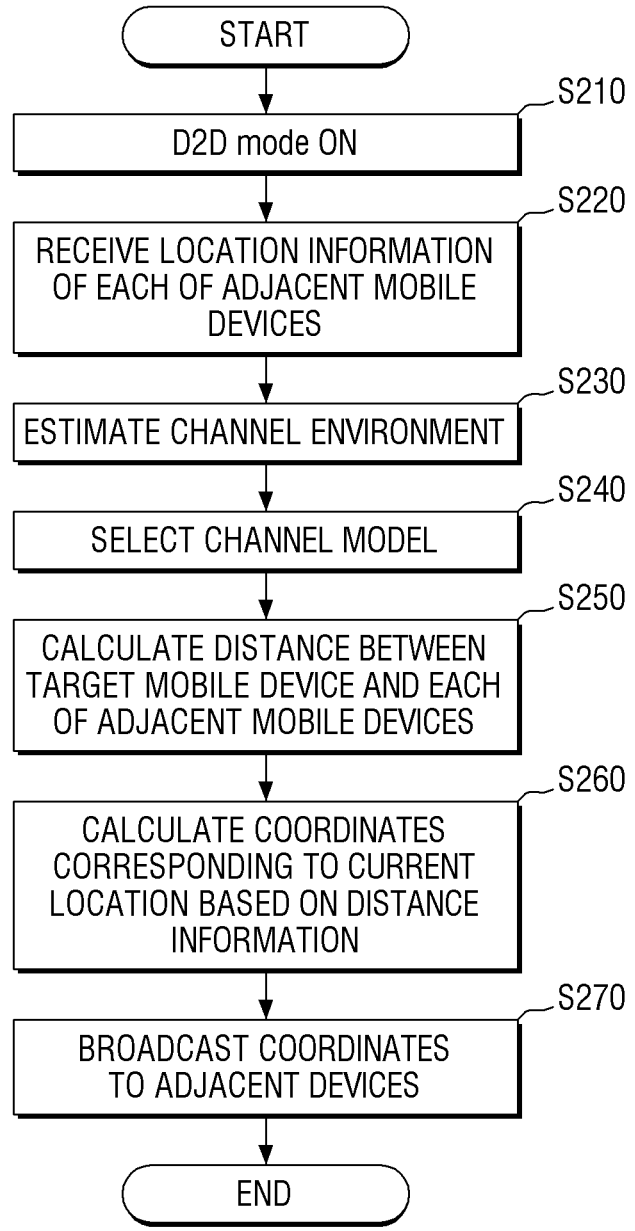

[fig. 3]

| Channel Factor | Channel Status | Channel Model |
|---|---|---|
| ~ 0.2 | URBAN AREA: POOR | Rician Model |
| 0.2 ~ 0.4 | URBAN AREA: AVERAGE | Stanford Univ. Model |
| 0.4 ~ 0.6 | URBAN AREA: GOOD | Okumura-Hata Model |
| 0.6 ~ 0.8 | OPEN AREA: POOR | Cost 231 Hata Model |
| 0.8 ~ 1 | OPEN AREA: GOOD | Free Space Model |

[fig. 4]

$$\begin{aligned} FSPL(dB) &= 10\log_{10}\left(\left(\frac{4\pi}{c}df\right)^2\right) \\ &= 20\log_{10}\left(\frac{4\pi}{c}df\right) \\ &= 20\log_{10}(d) + 20\log_{10}(f) + 20\log_{10}\left(\frac{4\pi}{c}\right) \\ &= 20\log_{10}(d) + 20\log_{10}(f) - 147.55 \end{aligned}$$

$$FSPL = \frac{P_t}{P_r}G_tG_r$$

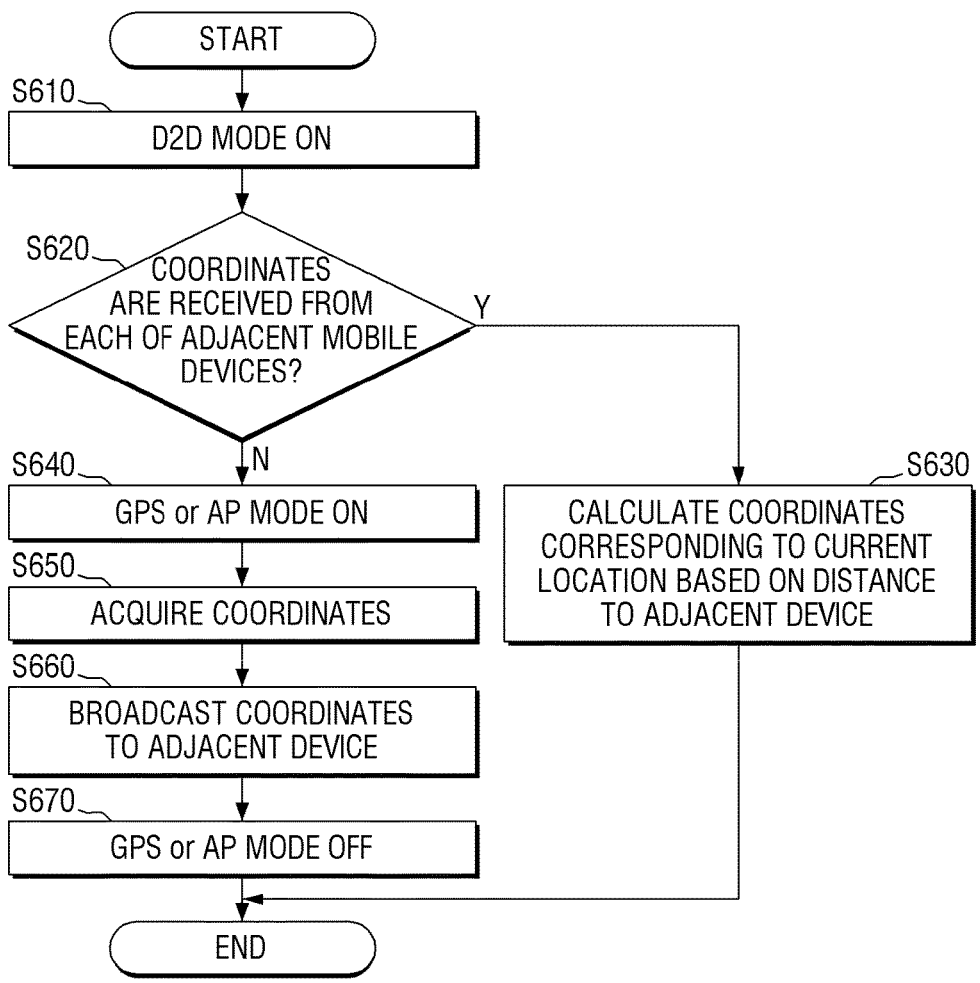

[fig. 7]
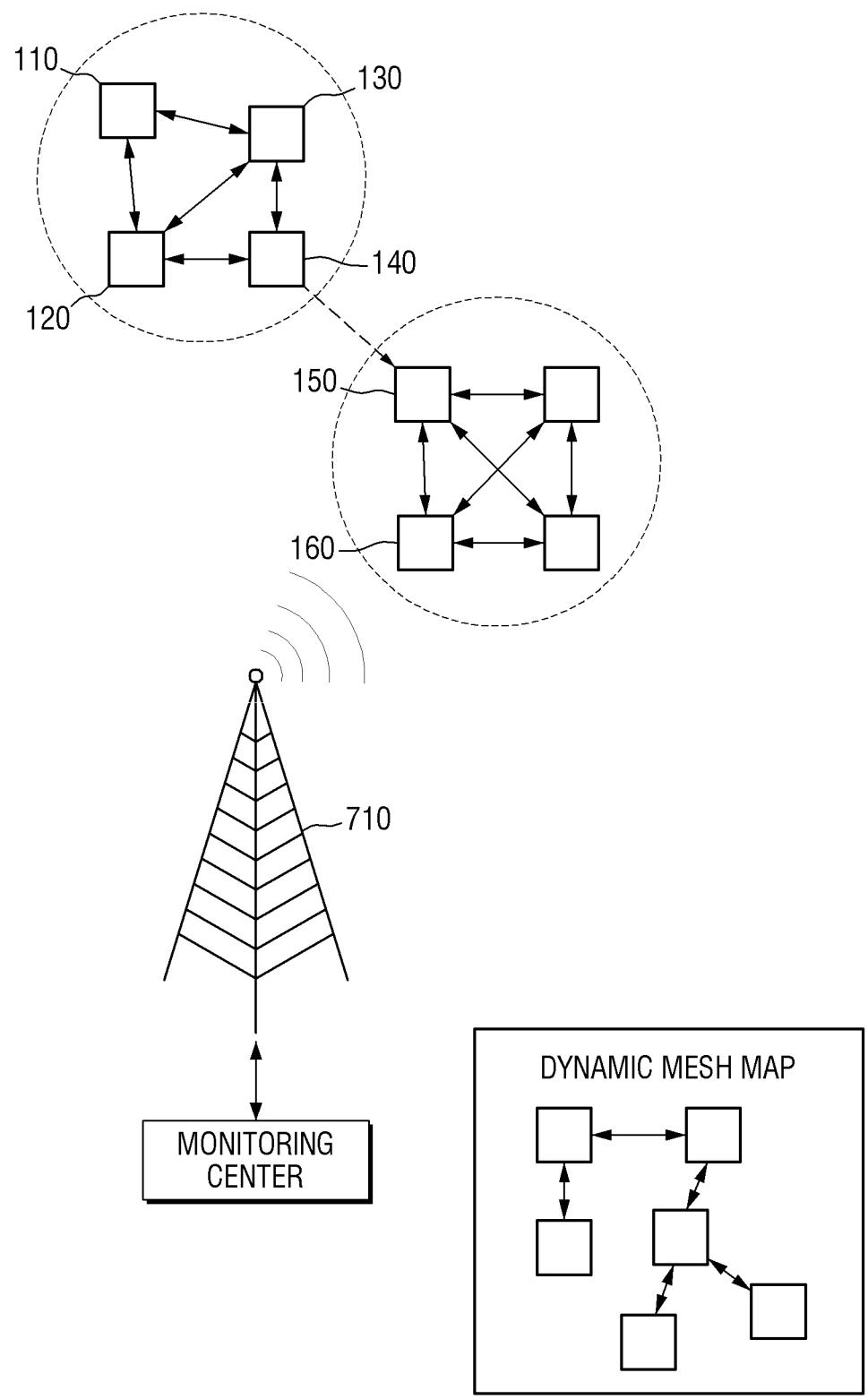

[fig. 8]
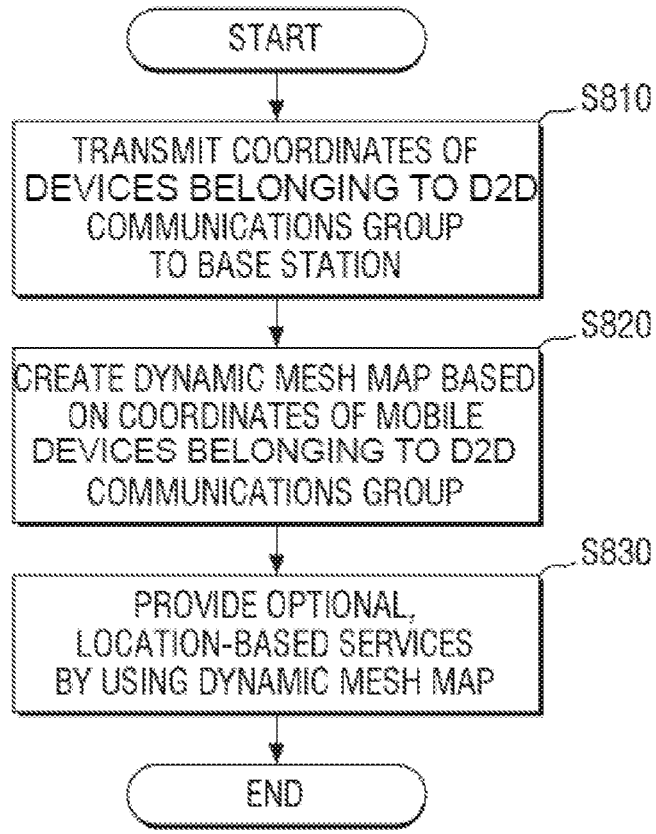
[fig. 9]
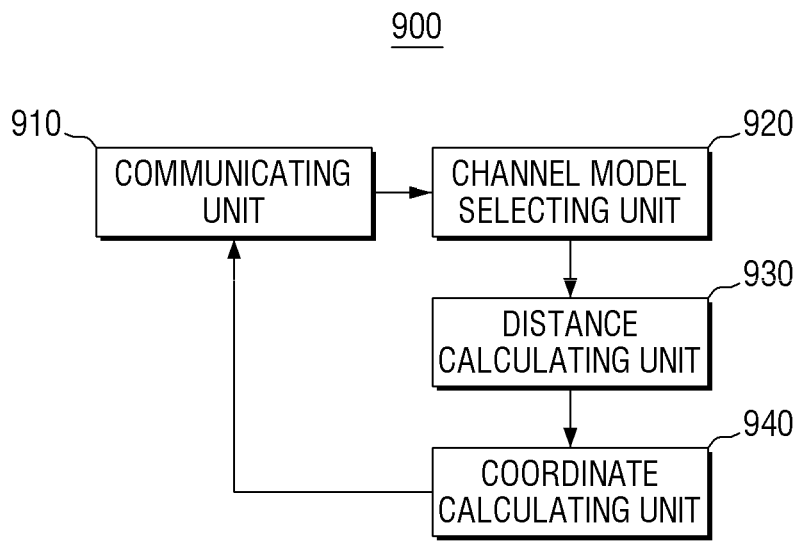

[fig. 10]
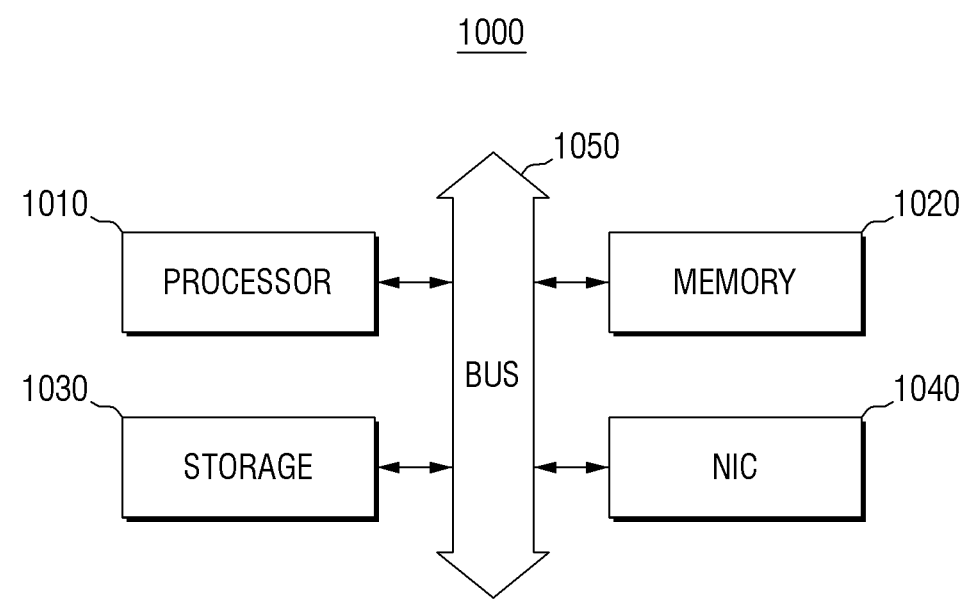

METHOD OF TRACKING USER'S LOCATION

This application claims priority from Korean Patent Application No. 10-2015-0140518 filed on Oct. 6, 2015 in the Korean Intellectual Property Office, the disclosure of which is incorporated herein by reference in its entirety.

BACKGROUND

1. Field of the Invention

The present disclosure relates to a method of tracking a user's location. More particularly, the present disclosure relates to a method of tracking a user's location by selecting an optimal channel model depending on a channel environment to track the position of a user carrying a mobile device.

2. Description of the Related Art

Recently, there exist a variety of techniques for tracking a user's position by locating the user's mobile device. For example, a method of tracking the position of a user carrying a mobile device by utilizing a global positioning system (GPS) or the cell IDs of base stations are commonly used.

Unfortunately, existing GPS based methods cannot normally track a user's location in an urban area or a mountainous terrain where line-of-sight (LOS) between the mobile device and satellites is obstructed.

In addition, existing tracking techniques based on the cell IDs of base stations exhibit a poor accuracy of a radius from 2 to 3 km, and thus cannot locate the position of the user accurately. For indoor location tracking method using Wi-Fi or Bluetooth, it is not possible to track the location of a user when communications infrastructure such as an access point (AP) fails to normally operate in case of a disaster.

Under the circumstances, what is required is a method of tracking a user's location that can locate the position of the user accurately in a variety of environments without establishing any additional infrastructure.

RELATED ART REFERENCE

Patent Reference

Korean Patent Laid-open Publication No. 2015-0053221

SUMMARY

Aspects of the present disclosure provide a method of tracking a user's location by which the position of a user carrying a mobile device can be estimated without requiring any additional infrastructure.

Aspects of the present disclosure also provide a method of tracking a user's location by which a user's location can be tracked more accurately by selecting a channel model depending on a communications environment.

This and other aspects, embodiments and advantages of the present disclosure will become immediately apparent to those of ordinary skill in the art upon review of the Detailed Description and Claims to follow.

According to an aspect of the present invention, there is provided a method of tracking a user's location, the method comprising receiving coordinate of each of adjacent mobile devices therefrom, estimating a channel environment to select an optimal channel model, calculating distance between the user's mobile device and each of the adjacent mobile devices based on the selected channel model and calculating coordinates corresponding to a current position of the user's mobile device based on the calculated distance.

In an embodiment of the present invention, wherein the estimating comprises: calculating a channel factor based on a signal received from each of the adhesive mobile devices and selecting a channel model associated with the calculated channel factor.

In an embodiment of the present invention, wherein the calculating the channel factor comprises estimating, by a coherent transceiver of the user's mobile device, a channel environment by performing multipath signal tracking to calculate the channel factor.

In an embodiment of the present invention, the method further comprising: broadcasting the coordinates corresponding to the current position of the user's mobile device to the adjacent mobile devices.

In an embodiment of the present invention, the method further comprising: transmitting the coordinates corresponding to the current position of the user's mobile device along with the coordinates of each of the adjacent mobile devices to a base station if the base station is within a predetermined distance from the user's mobile device.

In an embodiment of the present invention, wherein the receiving comprises: turning on a GPS module or a Wi-Fi module if the user's mobile device fails to receive the coordinates of each of the adjacent mobile devices so as to acquire the coordinates; and broadcasting the acquired coordinates to the adjacent mobile devices.

In an embodiment of the present invention, the method further comprising: turning off the GPS module or the Wi-Fi module if the acquired coordinates have been broadcast to the adjacent mobile devices.

In an embodiment of the present invention, wherein the receiving comprises receiving the coordinates of each of the adjacent mobile devices via a D2D communications channel based on a long term evolution (LTE) link.

According to another aspect of the present invention, there is provided a A mobile device, comprising: a communicating unit configured to receive coordinates of each of adjacent mobile devices therefrom, a channel model selecting unit configured to estimate a channel environment to select an optimal channel model, a distance calculating unit configured to calculate distance between the mobile device and each of the adjacent mobile devices based on the selected channel model and a coordinate calculating unit configured to calculate coordinates corresponding to a current position of the mobile device based on the calculated distance.

In an embodiment of the present invention, wherein the channel model selecting unit comprises a coherent transceiver that calculates a channel factor based on a signal received from each of the adjacent mobile devices and wherein the channel model selecting unit selects a channel model associated with the calculated channel factor.

In an embodiment of the present invention, wherein the coherent transceiver estimates a channel environment by performing multipath signal tracking to calculate the channel factor.

In an embodiment of the present invention, herein the communicating unit broadcasts the coordinates corresponding to the current position of the mobile device to the adjacent mobile devices.

In an embodiment of the present invention, wherein the communicating unit transmits the coordinates corresponding to the current position of the mobile device along with the coordinates of each of the adjacent mobile devices to a base station if the base station is within a predetermined distance from the mobile device.

In an embodiment of the present invention, further comprising: a location tracking unit configured to be turned on if the mobile device fails to receive the coordinates of each of the adjacent mobile devices so as to acquire the coordinates corresponding to the current location and wherein the communicating unit broadcasts the acquired coordinates to the adjacent mobile devices.

In an embodiment of the present invention, wherein the location tacking unit is turned off if the acquired coordinates have been broadcast to the adjacent mobile devices.

In an embodiment of the present invention, wherein the communicating unit receives the coordinates of each of the adjacent mobile devices via a D2D communications channel based on a LTE link.

According to another aspect of the present invention, there is provided a mobile device, comprising: at least one processor, a memory configured to load a program executed by the processor and storage configured to store a computer program capable of tracking a user's location, wherein the computer program causes the processor to perform the operations of: receiving coordinates of each of adjacent mobile devices therefrom, estimating a channel environment to select an optimal channel model, calculating distance between the mobile device and each of the adjacent mobile devices based on the selected channel model and calculating coordinates corresponding to a current position of the mobile device based on the distance between the mobile device and each of the adjacent mobile devices.

According to another aspect of the present invention, there is provided a non-transitory computer readable storage medium storing a computer program therein, the computer program causes a computer device in a mobile device to perform the operations of: receiving coordinates of each of adjacent mobile devices therefrom, estimating a channel environment to select an optimal channel model, calculating distance between the mobile device and each of the adjacent mobile devices based on the selected channel model and calculating coordinates corresponding to a current position of the mobile device based on the distance between the mobile device and each of the adjacent mobile devices.

BRIEF DESCRIPTION OF THE DRAWINGS

The above and other aspects and features of the present invention will become more apparent by describing in detail exemplary embodiments thereof with reference to the attached drawings, in which:

FIG. 1 is a diagram for illustrating a method of tracking a user's location according to an exemplary embodiment of the present disclosure;

FIG. 2 is a flowchart illustrating a method of tracking a user's location according to an exemplary embodiment of the present disclosure;

FIG. 3 is a diagram illustrating a way of estimating a propagation environment to select an optimal channel model for the environment according to an exemplary embodiment of the present disclosure;

FIG. 4 is a diagram illustrating processes of calculating distances between a target mobile device and each of adjacent mobile devices by using a selected channel model according to an exemplary embodiment of the present disclosure;

FIG. 5 is a diagram illustrating processes of calculating coordinates corresponding to the current location of a target mobile device by using distance between the target mobile device and each of adjacent mobile devices according to an exemplary embodiment of the present disclosure;

FIG. 6 is a flowchart for illustrating processes carried out when the coordinates of each of adjacent mobile devices are not received therefrom according to an exemplary embodiment of the present disclosure;

FIG. 7 is a diagram illustrating processes of transmitting broadcast coordinates of a mobile device to a base station via other mobile devices according to an exemplary embodiment of the present disclosure;

FIG. 8 is a flowchart illustrating processes of transmitting coordinates of the mobile device described above with respect to FIG. 7;

FIG. 9 is a block diagram illustrating a mobile device according to an exemplary embodiment of the present disclosure; and FIG. 10 is a block diagram illustrating a mobile device according to still another exemplary embodiment of the present disclosure.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, it will be understood that the singular forms are intended to include the plural forms as well. It will be further understood that the terms "comprises" and/or "comprising," when used in this specification, specify the presence of stated features, integers, steps, operations, elements, and/or components, but do not preclude the presence or addition of one or more other features, operations, elements, and/or components thereof.

FIG. 1 is a diagram for illustrating a method of tracking a user's location according to an exemplary embodiment of the present disclosure.

In this exemplary embodiment, it is assumed that a plurality of mobile devices is located in a space, and the devices are connected to one another in a device-to-device (D2D) communications scheme. Specifically, each of the mobile devices performs the D2D communications scheme based on the long term evolution (LTE) link.

According to this exemplary embodiment, a first mobile device 110 receives coordinates of each of a second mobile device 120, a third mobile device 130 and a fourth mobile device 140, which are located adjacent to the first mobile device 110, in order to calculate coordinates corresponding to its current location.

The coordinates of each of the second to fourth mobile devices 120 to 140 may be obtained by using the GPS, the cell IDs, or access points (APs) adjacent thereto. Alternatively, the coordinates of each of the second to fourth mobile devices 120 to 140 may be calculated by using the method of tracking a user's location according to an exemplary embodiment of the present disclosure.

Once the first mobile device 110 receives location information of each of the second to fourth mobile devices 120 to 140, the first mobile device 110 analyzes the propagation environment and estimates the channel environment by using a coherent transceiver installed therein.

For example, it is estimated based on a channel factor measured by the coherent transceiver in the mobile device whether the first mobile device 110 is located in an open area where communications condition is good or in an urban area where communications condition is bad.

Once the channel environment is estimated, an optimal channel model for the estimated channel environment is selected. In the exemplary embodiment of the present disclosure, the channel model may be one of Rician model, Stanford Univ. model, Okumura-Hata model, Cost231 model, Cost231 Hata model, Free Space model. However, the channel model is not limited to those above-listed but may be any of widely used channel models.

Once the channel model is selected, the distance between the first mobile device 110 and each of the mobile devices 120, 130 and 140 is calculated based on the selected channel model.

Then, the coordinates of the first mobile device 110 is calculated based on the calculated distance between the first mobile device 110 and each of the mobile devices 120, 130 and 140.

A way of calculating the coordinates of the first mobile device 110 based on the distance between the first mobile device 110 and each of the mobile devices 120, 130 and 140 will be described in detail below.

The coordinates of the first mobile device 110 thus calculated may be broadcast to other mobile devices. For example, the coordinates of the first mobile device 110 may be transmitted to other mobile devices 200 which are connected thereto in a D2D communications scheme based on a LTE link.

In addition, the coordinates of the first mobile device 110 can be transmitted to other mobile devices out of the coverage of the D2D communications based on the LTE link via hopping by mobile devices connected in the D2D communications scheme For example, if a fifth mobile device 150 is out of the D2D communications coverage from the first mobile device 110 so that it cannot be directly connected to the first mobile device 110, the coordinates of the first mobile device 110 can be transmitted to the fifth mobile device 150 via the third mobile device 130 when the location information of the first mobile device 110 is broadcast to the third mobile device 130.

In addition, by repeating the above process, a dynamic mesh map including coordinates of a plurality of mobile devices in a particular area can be created. Accordingly, a location-based service can be provided.

Moreover, the coordinates can be calculated more accurately, compared to existing location tracking methods.

FIG. 2 is a flowchart illustrating a method of tracking a user's location according to an exemplary embodiment of the present disclosure.

According to this exemplary embodiment of the present disclosure, when a D2D communication mode based on a LTE link is turned on (step S210), location information of each of adjacent mobile devices is received (step S220). If two-dimensional coordinates of a target mobile device are desired, coordinates from at least two adjacent mobile devices have to be received. If three-dimensional coordinates of a target mobile device are desired, coordinates from at least three adjacent mobile devices have to be received.

Subsequently, the mobile device calculates a channel factor to estimate a channel environment (step S230). Information on optimal channel models each corresponding to the respective calculated channel factors may be stored in advance in the mobile device according to an exemplary embodiment of the present disclosure.

Accordingly, when the coherent transceiver included in the mobile device analyzes the propagation environment to calculate a channel factor, an optimal channel model for the calculated channel factor is selected (step S240).

Once the optimal channel model for the propagation environment is selected, the distance between the target mobile device and each of adjacent mobile devices is calculated based on the channel model (step S250).

Mathematical equations used in calculating the distances between the mobile devices may vary depending on the selected channel model. A way of calculating the distances between the mobile devices using the channel model will be described in detail with respect to FIG. 4.

Once the distances between the mobile devices are calculated, the coordinates of the target mobile device are calculated using the values (step S260). If coordinates of three adjacent mobile devices have been received, the x, y and z coordinates of the target mobile device can be calculated.

The coordinates of the mobile device 110 thus calculated may be broadcast to other mobile devices (step S270). In addition, by repeating the above processes, a dynamic mesh map associated with a plurality of mobile devices in a space may be created. As used herein, the dynamic mesh map refers to a map including location information of a plurality of mobile devices.

By receiving coordinates of adjacent mobile devices using the D2D communications scheme based on the LTE link and transmitting the calculated location information to nearby mobile devices, it is possible to accurately locate the position of the user carrying the mobile device even in an outdoor environment where the GPS signals are weak.

In addition, according to the exemplary embodiment, the location accuracy can be improved up to a radius from several to tens of meters, compared to a very low location accuracy of the existing method based on the cell IDs of base stations, e.g., a radius from 2 to 3 km.

In addition, even if a communications infrastructure such as the AP, Wi-Fi, Bluetooth, etc., is broken in an indoor environment such as a large shopping mall in case of a disaster, the user's position can be accurately located.

Moreover, a variety of location-based services can be provided by using the dynamic mesh map created based on the location information of a plurality of users.

FIG. 3 is a diagram for illustrating a way of estimating a propagation environment to select an optimal channel model for the environment according to an exemplary embodiment of the present disclosure.

A channel model refers to a model used in predicting signal strength depending on distance, location, geographical feature by modeling propagation characteristics of electromagnetic wave based on theoretical and experimental results. Accordingly, distances between mobile devices transmitting/receiving electromagnetic wave to/from one another can be calculated by selecting a channel model depending on the propagation characteristics and entering measured variables.

Information on optimal channel models each corresponding to the respective measured channel factors may be stored in advance in the mobile device according to an exemplary embodiment of the present disclosure. For example, if a channel factor measured by a coherent transceiver in a mobile device is 0.2 or less, it is estimated that the mobile device is in an urban area where transmission/reception of electromagnetic wave is poor, and Rician model may be selected as the channel model.

For another example, if the measured channel factor is larger than 0.8 and equal to or less than 1, Free space model may be selected as the channel model.

The channel factor may be calculated as expressed in Equation below:

$$\text{Channel Factor}(t0) = \delta_1(t0) - \delta_2(t0)$$

$$0 \leq CF(t0) \leq 1 \quad \text{[Mathematical Expression 1]}$$

where $\delta_1(t0)$ denotes an auto-correlation value at the time delay t0 of a signal received firstly, and $\delta_2(t0)$ denotes an auto-correlation value at the time delay t0 of a signal received secondly.

As the channel factor value gets closer to 1, the channel environment is more likely to be the LOS environment (e.g., an open area). On the other hand, the channel factor value gets closer to 0, the channel environment is more likely to be the non-line-of-sight (NLOS) environment (e.g., an urban area where communications condition is poor).

Hereinafter, processes of calculating distances between adjacent mobile devices by using a channel model selected as the optimal model will be described.

FIG. 4 is a diagram for illustrating processes of calculating distances between a target mobile device and each of adjacent mobile devices by using a selected channel model according to an exemplary embodiment of the present disclosure.

In the example shown in FIG. 4, the selected channel model is Free Space model. It will be appreciated that the selectable channel model is not limited thereto but any of a variety of channel models may be selected depending on the propagation environment.

The free space path loss (FSPL) in a free space such as an open space where the propagation environment is good is calculated as expressed in Equation 1 shown in FIG. 4:

$$FSPL(\text{dB}) = 10\log_{10}\left(\left(\frac{4\pi}{c}df\right)^2\right) \quad \text{[Mathematical Expression 2]}$$

This may be summarized as follows:

$$= 20\log_{10}\left(\frac{4\pi}{c}df\right) \quad \text{[Mathmatical Expression 3]}$$
$$= 20\log_{10}(d) + 20\log_{10}(f) +$$
$$\quad 20\log_{10}(f) + 20\log_{10}\left(\frac{4\pi}{c}\right)$$
$$= 20\log_{10}(d) + 20\log_{10}(f) - 147.55$$

where d denotes distance between a target mobile device and an adjacent mobile device, f denotes frequency of electromagnetic wave, and c denotes loss coefficient independent of the propagation path.

The FSPL may also be calculated as expressed in another equation as shown in FIG. 4.

$$FSPL = \frac{P_t}{P_r}G_tG_r \quad \text{[Mathematical Expression 4]}$$

where Pt denotes transmission power, Pr denotes reception power, Gt denotes gain of a transmitting antenna, and Gr denotes gain of a receiving antenna.

Accordingly, by calculating the FSPL using Equation 3, and substituting the calculated value in Equation 2, the distance d between the target mobile device and the adjacent mobile device can be calculated.

Once the distance d is calculated, the coordinates of the target mobile device can be calculated.

FIG. 5 is a diagram for illustrating processes of calculating coordinates corresponding to the current location of a target mobile device by using distance between the target mobile device and each of adjacent mobile devices according to an exemplary embodiment of the present disclosure.

In this exemplary embodiment, in order to calculate the coordinates of the current location of the first mobile device 110 shown in FIG. 1, coordinates of each of the adjacent second to fourth devices 120 to 140 are used.

In the mathematical expressions shown in FIG. 5, d1 denotes the distance between the first mobile device 110 and the second mobile device 120. The distance d1 between the first mobile device 110 and the second mobile device 120 may be calculated in the manner described above with respect to FIG. 4.

The symbols x1 and y1 denote coordinates of the second mobile device 120. The coordinates of the second mobile device 120 may be calculated using the GPS, the cell IDs, or nearby access points (APs). Alternatively, the coordinates may be calculated by using the method of tracking a user's location described above.

Similarly, d2 denotes the distance between the first mobile device 110 and the third mobile device 130, and x2 and y2 denote coordinates of the third mobile device. In the equations shown in FIG. 5, there are two unknowns, x and y, representing the coordinates of the first mobile device. Accordingly, if the distance d1 between the first mobile device 110 and the second mobile device 120, the coordinates x1 and y1 of the second mobile device 120, the distance d2 between the first mobile device 110 and the third mobile device 130, and the coordinates x2 and y2 of the third mobile device 130 are given, the coordinates of the first mobile device 110 can be calculated.

If the coordinates of the first mobile device 110 are three-dimensional, there exist three unknowns, x, y and z. In this case, the coordinates x, y and z of the first mobile device 110 can be calculated by receiving three-dimensional coordinates from each of the second to fourth mobile devices 120 to 140 and establishing three equations.

As described above, coordinates of adjacent mobile devices are received via the D2D communications scheme based on the LTE link, distances between the mobile devices are calculated, and then the coordinates of the target mobile device are calculated. As a result, it is possible to calculate the coordinates more accurately, compared to existing location tracking methods.

In addition, according to an exemplary embodiment of the present disclosure, a method of tracking a user's location includes receiving coordinates of each of adjacent mobile devices therefrom, and calculating coordinates of the user's mobile device.

In doing so, coordinates may not be received from adjacent mobile devices. This may happen when there is no mobile device within the coverage of the D2D communications based on the LTE link or when mobile devices, even if they are within the coverage, fail to acquire their coordinates.

FIG. 6 is a flowchart for illustrating processes carried out when the coordinates of each of adjacent mobile devices are not received therefrom according to an exemplary embodiment of the present disclosure.

In FIG. 1, the first mobile device 110 may turn on a D2D mode in order to calculate its coordinates (step S610). After turning on the D2D mode, it is determine whether coordinates are received from each of adjacent mobile devices (step S620). If coordinates of each of the adjacent mobile devices are received, the first mobile device 110 calculates its coordinates in the above-described manner (step S630).

On the other hand, if the coordinates of each of the adjacent mobile devices are not received, a GPS mode, a Wi-Fi mode or the like is turned on (step S640). Subsequently, the first mobile device 110 acquires its location information in the GPS mode or the Wi-Fi mode, whichever is turned on (step S650). Then, the first mobile device 110 broadcasts the acquired coordinates to adjacent mobile devices (step S660), so that its coordinates can be used in calculating the coordinates of another mobile device.

After broadcasting its coordinates, the first mobile device 110 turns off the GPS mode, the Wi-Fi mode or the like (step S670). That is, the first mobile device 110 allows its coordinates to be used as criterion coordinates in calculating the coordinates of other mobile devices.

FIG. 7 is a diagram for illustrating processes of transmitting broadcast coordinates of a mobile device to a base station via other mobile devices according to an exemplary embodiment of the present disclosure.

The coordinates of the mobile device thus calculated may be transmitted to the base station 710 via adjacent other mobile devices. A management server (not shown) may receive the coordinates of each of a plurality of mobile devices via the base station 710 and may provide a variety of location-based services to a plurality of users.

This allows for rapid rescue in case of a variety of disasters by locating a user accurately.

For example, if there is no base station 710 adjacent to the first mobile device 110 in FIG. 7 so that the first mobile device 110 cannot directly transmit its coordinates to the base station 710, the coordinates can be transmitted to the base station 720 via the other mobile devices and in turn to the management server.

In the exemplary embodiment shown in FIG. 7, the coordinates of the first mobile device 110 may be calculated in the manner described above with respect to FIGS. 1 to 6. The calculated coordinates may be transmitted to adjacent mobile devices, e.g., the third mobile device 130, the fourth mobile device, etc.

The fourth mobile device 140 may receive the coordinates of the first mobile device 110 and then may transmit them to the fifth mobile device 150. The fifth mobile device 150 may transmit the received coordinates of the first mobile device 110 to the sixth mobile device 150.

If the sixth mobile device 160 is adjacent to the base station 710, the coordinates of the first mobile device 110 may be transmitted to the base station 710, so that the coordinates of the first mobile device 110 may be transmitted to the management server.

Although only the coordinates of the first mobile device 110 is transmitted to the management server via the sixth mobile device 160 adjacent to the base station 710 in the above-described embodiment, the coordinates of any of the other mobile devices shown in FIG. 7 may also be transmitted to the management server in the above-described processes.

Accordingly, the management server may create a virtual map with respect to a plurality of users carrying mobile devices, and may provide a variety of services to the users based on it.

In the above-described embodiment, the coordinates of each of the plurality of mobile devices are transmitted to the management server, so that rapid rescue is possible in case of a disaster, and location-based service can be provided. However, this is merely illustrative and the above services may be provided even without existing infrastructure such as the management server. For example, mobile devices in a particular area may share their coordinates without transmitting the coordinates to the management server, so that one mobile device may identify the coordinates of other mobile devices.

Accordingly, the position of a user carrying a mobile device can be located even without a management server, and the location-based service can be provided.

FIG. 8 is a flowchart illustrating processes of transmitting coordinates of the mobile device described above with respect to FIG. 7.

Each of mobile devices belonging to a D2D communications group may transmit its coordinates along with coordinates of each of adjacent mobile devices received therefrom to other mobile devices.

Accordingly, a mobile device within the coverage of the base station 710 may transmit its coordinates along with the coordinates of each of the mobile devices belonging to the D2D communications group collected by hopping to the base station 710 (step S810).

A management server may receive the coordinates of each of the plurality of mobile devices via the base station 710 and may create a dynamic mesh map based on the coordinates of the mobile devices belonging to the D2D communications group (step S820).

Subsequently, a variety of optional, location-based services may be provided by using the dynamic mesh map (step S830). For example, marketing information such as famous restaurants, theaters, etc., near a user carrying the mobile device may be provided.

FIG. 9 is a block diagram illustrating a mobile device according to an exemplary embodiment of the present disclosure.

A mobile device 900 according to an exemplary embodiment of the present disclosure may include a communicating unit 910, a channel model selecting unit 920, a distance calculating unit 930, and a coordinate calculating unit 940.

It is to be noted that FIG. 9 only shows the elements related to this exemplary embodiment. Accordingly, those skilled in the art would understand that the mobile device 900 may further include other elements in addition to those shown in FIG. 9.

The communicating unit 910 receives coordinates of each of adjacent mobile devices therefrom. The communicating unit 910 may receive the coordinates of each of the adjacent mobile devices via a D2D communications channel based on a LTE link.

The channel model selecting unit 920 estimates a channel environment to select an optimal channel model for the environment. Specifically, the channel model selecting unit 920 may include a coherent transceiver (not shown). The coherent transceiver may estimate the channel environment via multipath signal tracking.

The distance calculating unit 930 calculates distance between the mobile device 900 and each of the adjacent mobile devices by using the selected channel model. Once the distance between the mobile device 900 and each of the adjacent mobile devices is calculated, the coordinate calculating unit 940 calculates the coordinates corresponding to the current position of the mobile device 900 by using the calculated distance.

If the coordinates of each of the adjacent mobile devices are not received, the mobile device 900 may turn on a location tracking unit (not shown) to acquire coordinates corresponding to the current position, and then may broadcast the acquired coordinates corresponding to the current position of the mobile device 900 to the adjacent mobile devices.

According to an exemplary embodiment of the present disclosure, the location tracking unit may be a GPS mobile device or a Wi-Fi module. However, any other device may be used as the location tracking unit as long as it has the capability of acquiring coordinates corresponding to the current position.

As described above, by acquiring the coordinates corresponding to the current position by using the coordinates of each of the adjacent mobile devices and the distance between the mobile device and each of the adjacent mobile devices, it is possible to acquire the coordinates more accurately.

FIG. 10 is a block diagram illustrating a mobile device according to still another exemplary embodiment of the present disclosure.

A mobile device 1000 shown in FIG. 10 includes a processor 1010, a memory 1020, storage 1030, a network interface 1040, and a bus.

It is to be noted that FIG. 10 only shows the elements related to this exemplary embodiment. Accordingly, those skilled in the art would understand that the mobile device 1000 may further include other elements in addition to those shown in FIG. 10.

The processor 1010 executes a program capable of tracking a user's location. However, the program executed on the processor 1010 is not limited thereto but may include any of widely used programs.

The memory 1020 may load a program capable of tracking a user's location so that the program is executed on the processor 1010.

The storage 1030 stores a program capable of tracking a user's location therein. In addition, the storage 1030 may store information on optimal channel models for channel factors therein. The program for tracking a user's location causes the processor to perform the operations of: receiving coordinates of each of adjacent mobile devices therefrom; estimating a channel environment to select an optimal channel model; calculating distance between the user's mobile device and each of the adjacent mobile devices based on the selected channel model; and calculating coordinates corresponding to the current position of the mobile device based on the distance between the mobile device and each of the adjacent mobile devices.

The network interface 1040 may be connected to another mobile device. The network interface 1040 according to an exemplary embodiment may be connected to another mobile device via a D2D communications channel based on a LTE link The bus 1050 works as a data transfer path among the processing 1010, the memory 1020, the storage 1030 and the network interface 1040.

The method for tracking user's location according to the present invention can be recorded in programs that can be executed on a computer and be implemented through general purpose digital computers. In addition, the data format used in the method for for generating the web page according to the present invention may be recorded in a computer-readable recording medium using various means. Examples of the computer-readable recording medium may include recording media such as magnetic storage media (e.g., ROMs, floppy disks, hard disks, etc.) and optical recording media (e.g., CD-ROMs or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A method of locating a mobile device, the method comprising:
   receiving coordinates of each of a plurality of adjacent mobile devices from the respective adjacent mobile devices;
   estimating a channel environment by using a coherent transceiver of the mobile device to calculate a channel factor based on a signal received from each of the plurality of adjacent mobile devices, and selecting a channel model based on the calculated channel factor;
   calculating a distance between the mobile device and each of the plurality of adjacent mobile devices based on the selected channel model;
   calculating coordinates corresponding to a position of the mobile device based on the calculated distance; and
   broadcasting the coordinates corresponding to the position of the mobile device to the plurality of adjacent mobile devices.

2. The method of claim 1, wherein the calculating the channel factor comprises using the coherent transceiver of the mobile device to perform multipath signal tracking.

3. The method of claim 1, further comprising:
   determining that a base station is within a predetermined distance from the mobile device; and
   transmitting the coordinates corresponding to the position of the mobile device along with the coordinates of each of the plurality of adjacent mobile devices to the base station.

4. The method of claim 1, wherein the receiving comprises:
   activating a GPS module or a wireless network in response to the mobile device failing to receive the coordinates of each of the plurality of adjacent mobile devices from the respective adjacent mobile devices;
   acquiring the coordinates corresponding to the position of the mobile device using the GPS module or the wireless network; and
   broadcasting the acquired coordinates to the plurality of adjacent mobile devices.

5. The method of claim 4, further comprising:
deactivating the GPS module or the wireless network in response to the broadcasting the acquired coordinates to the plurality of adjacent mobile devices.

6. The method of claim 1, wherein the receiving comprises receiving the coordinates of each of the plurality of adjacent mobile devices via a device-to-device communications channel based on a long term evolution (LTE) link.

7. A mobile device comprising:
a communication unit configured to receive coordinates of each of a plurality of adjacent mobile devices from respective adjacent mobile devices;
a channel model selecting unit configured to estimate a channel environment and to select a channel model based on the estimated channel environment;
a distance calculating unit configured to calculate a distance between the mobile device and each of the plurality of adjacent mobile devices based on the selected channel model; and
a coordinate calculating unit configured to calculate coordinates corresponding to a position of the mobile device based on the calculated distance,
wherein the channel model selecting unit comprises a coherent transceiver configured to calculate a channel factor based on a signal received from each of the plurality of adjacent mobile devices,
wherein the channel model selecting unit is further configured to select a channel model based on the calculated channel factor, and
wherein the communication unit is further configured to broadcast the coordinates corresponding to the position of the mobile device to the plurality of adjacent mobile devices.

8. The mobile device of claim 7, wherein the coherent transceiver is further configured to perform multipath signal tracking to calculate the channel factor.

9. The mobile device of claim 7, wherein the communication unit is further configured to transmit the coordinates corresponding to the position of the mobile device along with the coordinates of each of the plurality of adjacent mobile devices to a base station.

10. The mobile device of claim 7, further comprising:
a location tracking unit configured to be activated if the mobile device fails to receive the coordinates of each of the plurality of adjacent mobile devices and to acquire the coordinates corresponding to the position of the mobile device, and
wherein the communication unit is further configured to broadcast the acquired coordinates to the plurality of adjacent mobile devices.

11. The mobile device of claim 10, wherein the location tacking unit is further configured to be deactivated if the acquired coordinates have been broadcast to the plurality of adjacent mobile devices.

12. The mobile device of claim 7, wherein the communication unit is further configured to receive the coordinates of each of the plurality of adjacent mobile devices via a device-to-device communications channel based on a LTE link.

13. A mobile device comprising:
at least one processor;
a memory configured to store a program that is executed by the processor; and
a storage configured to store a computer program capable of locating a mobile device, wherein the computer program causes the processor to perform operations of:
receiving coordinates of each of a plurality of adjacent mobile devices from respective adjacent mobile devices;
estimating a channel environment by using a coherent transceiver of the mobile device to calculate a channel factor based on a signal received from each of the plurality of adjacent mobile devices, and selecting a channel model based on the calculated channel factor;
calculating a distance between the mobile device and each of the plurality of adjacent mobile devices based on the selected channel model;
calculating coordinates corresponding to a position of the mobile device based on the distance between the mobile device and each of the plurality of adjacent mobile devices; and
broadcasting the coordinates corresponding to the position of the mobile device to the plurality of adjacent mobile devices.

14. A non-transitory computer readable storage medium storing a computer program therein, wherein the computer program is operable to cause a computer device located in a mobile device to perform operations of:
receiving coordinates of each of a plurality of adjacent mobile devices from respective adjacent mobile devices;
estimating a channel environment by using a coherent transceiver of the mobile device to calculate a channel factor based on a signal received from each of the plurality of adjacent mobile devices, and selecting a channel model based on the calculated channel factor;
calculating a distance between the mobile device and each of the plurality of adjacent mobile devices based on the selected channel model;
calculating coordinates corresponding to a position of the mobile device based on the distance between the mobile device and each of the plurality of adjacent mobile devices; and
broadcasting the coordinates corresponding to the position of the mobile device to the plurality of adjacent mobile devices.

15. The method of claim 1, wherein the selected channel model is one of a Rician fading model, a Stanford University Interim (SUI) model, an Okumura-Hata model, a Cost 231 model, a Cost 231 Hata model, and a Free Space model.

16. The mobile device of claim 7, wherein the channel model is one of a Rician fading model, a Stanford University Interim (SUI) model, an Okumura-Hata model, a Cost-231 model, a Cost-231 Hata model, and a Free Space model.

* * * * *